US010029643B2

(12) United States Patent
Spahn et al.

(10) Patent No.: US 10,029,643 B2
(45) Date of Patent: Jul. 24, 2018

(54) AIRBAG INCLUDING A PLURALITY OF FINGERS EXTENDING FROM AN IMPACT SURFACE

(71) Applicant: Ford Global Technologies, LLC, Dearborn, MI (US)

(72) Inventors: Brian Robert Spahn, Plymouth, MI (US); Dean M. Jaradi, Macomb, MI (US); S. M. Iskander Farooq, Novi, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/242,708

(22) Filed: Aug. 22, 2016

(65) Prior Publication Data
US 2018/0050654 A1    Feb. 22, 2018

(51) Int. Cl.
*B60R 21/233*    (2006.01)
*B60R 21/205*    (2011.01)
*B60R 21/239*    (2006.01)

(52) U.S. Cl.
CPC .......... *B60R 21/233* (2013.01); *B60R 21/205* (2013.01); *B60R 21/239* (2013.01); *B60R 2021/23308* (2013.01); *B60R 2021/23324* (2013.01)

(58) Field of Classification Search
CPC ... B60R 21/205; B60R 21/233; B60R 21/239; B60R 2021/0048; B60R 2021/23308; B60R 2021/23324; B60R 2021/2395
See application file for complete search history.

(56) References Cited

U.S. PATENT DOCUMENTS

| 3,747,952 A | * | 7/1973 | Graebe | B60R 21/205 137/67 |
| 6,308,983 B1 | | 10/2001 | Sinnhuber | |
| 6,443,513 B1 | * | 9/2002 | Glance | B32B 3/12 293/102 |
| 6,817,626 B2 | * | 11/2004 | Boll | B60R 21/213 280/730.1 |
| 6,851,706 B2 | * | 2/2005 | Roberts | B60R 21/23138 280/730.1 |

(Continued)

FOREIGN PATENT DOCUMENTS

| CN | 101353037 A | 1/2008 |
| CN | 102416920 A | 4/2012 |

(Continued)

*Primary Examiner* — Laura Freedman
(74) *Attorney, Agent, or Firm* — Frank A. MacKenzie; Bejin Bieneman PLC (57) ABSTRACT

An airbag includes a panel and a plurality of fingers. The panel includes an impact surface and defines an inflation chamber inflatable to an inflated state. The plurality of fingers are in communication with the inflation chamber. Each of the fingers are spaced from each other and extend from the impact surface away from the inflation chamber in the inflated state. During a vehicle impact, the momentum of the occupant may move the occupant towards the plurality of fingers. The fingers may absorb energy from the occupant and reduce or prevent the head of the occupant from sliding across the impact surface and/or rotating.

16 Claims, 10 Drawing Sheets

(56) References Cited

U.S. PATENT DOCUMENTS

| | | | | |
|---|---|---|---|---|
| 6,923,483 B2* | 8/2005 | Curry | B60R 19/205 | |
| | | | 180/274 | |
| 7,584,988 B2* | 9/2009 | Okamoto | B60R 21/36 | |
| | | | 180/274 | |
| 8,038,169 B2* | 10/2011 | Rick | B60R 21/206 | |
| | | | 280/732 | |
| 8,087,690 B2 | 1/2012 | Kim | | |
| 8,376,396 B2* | 2/2013 | Miller | B60R 21/206 | |
| | | | 280/729 | |
| 8,579,321 B2* | 11/2013 | Lee | B60R 21/214 | |
| | | | 280/729 | |
| 8,613,465 B2* | 12/2013 | Nozaki | B60R 21/23138 | |
| | | | 280/729 | |
| 8,678,429 B2* | 3/2014 | Nagasawa | B60R 21/233 | |
| | | | 280/729 | |
| 8,876,153 B2* | 11/2014 | Dix | B60R 21/233 | |
| | | | 280/729 | |
| 9,296,353 B1* | 3/2016 | Choi | B60R 21/01554 | |
| 9,296,359 B2* | 3/2016 | Pan | B60R 21/233 | |
| 9,333,938 B2* | 5/2016 | Guerrero | B60R 21/233 | |
| 9,346,432 B2* | 5/2016 | Sugimoto | B60R 21/237 | |
| 9,446,733 B2* | 9/2016 | Pausch | B60R 21/231 | |
| 9,446,735 B1* | 9/2016 | Jayasuriya | B60R 21/232 | |
| 9,475,445 B2* | 10/2016 | Jindal | B60R 21/233 | |
| 9,533,652 B1* | 1/2017 | Paxton | B60R 21/239 | |
| 9,550,465 B1* | 1/2017 | El-Jawahri | B60R 21/01512 | |
| 9,580,039 B2* | 2/2017 | Schneider | B60R 21/233 | |
| 9,623,831 B1* | 4/2017 | Deng | B60R 21/239 | |
| 9,650,011 B1* | 5/2017 | Belwafa | B60R 21/233 | |
| 9,676,355 B2* | 6/2017 | Kruse | B60R 21/0136 | |
| 9,738,243 B2* | 8/2017 | Fukawatase | B60R 21/233 | |
| 2004/0256842 A1* | 12/2004 | Breed | B32B 5/26 | |
| | | | 280/730.1 | |
| 2009/0001695 A1* | 1/2009 | Suzuki | B60R 21/231 | |
| | | | 280/730.2 | |
| 2009/0212537 A1* | 8/2009 | Slaats | B60R 21/232 | |
| | | | 280/728.2 | |
| 2013/0088056 A1* | 4/2013 | Quatanens | B60R 21/233 | |
| | | | 297/216.13 | |
| 2016/0001735 A1* | 1/2016 | Quatanens | B60R 21/233 | |
| | | | 244/121 | |
| 2016/0229370 A1* | 8/2016 | Hampson | B60R 21/232 | |
| 2016/0318471 A1* | 11/2016 | Swiniarski | B60R 21/232 | |
| 2016/0347272 A1* | 12/2016 | Kato | B60R 21/207 | |
| 2017/0028955 A1* | 2/2017 | Ohno | B60R 21/207 | |
| 2017/0057453 A1* | 3/2017 | Morris | B60R 21/233 | |
| 2017/0088086 A1* | 3/2017 | El-Jawahri | B60R 21/233 | |
| 2017/0136981 A1* | 5/2017 | Fukawatase | B60R 21/233 | |
| 2017/0174170 A1* | 6/2017 | Aranzulla | B60R 21/231 | |

FOREIGN PATENT DOCUMENTS

| | | | |
|---|---|---|---|
| CN | 205131175 U | | 4/2016 |
| GB | 2339738 A | | 2/2000 |
| JP | 2012101568 A | * | 5/2012 |
| WO | WO 2015165592 A1 | | 11/2015 |

* cited by examiner

AIRBAG INCLUDING A PLURALITY OF FINGERS EXTENDING FROM AN IMPACT SURFACE

BACKGROUND

During a vehicle impact, occupants may move in a direction influenced by the momentum of the vehicle. Some vehicle impacts, e.g., side impact, frontal offset impacts, far side oblique impact, near side oblique impact, etc., may cause the occupants to move at an angle towards vehicle components, e.g., toward an A-pillar, hinge pillar, door, etc. In this situation, the momentum of the occupant may urge the head of the occupant to slide and/or rotate across a face of an inflated airbag.

DETAILED DESCRIPTION

With reference to the Figures, wherein like numerals indicate like parts throughout the several views, an airbag 10 of a vehicle 12 includes a panel 14 and a plurality of fingers 16. The panel 14 includes an impact surface 18 and defines an inflation chamber 20 inflatable to an inflated state. The plurality of fingers 16 are in communication with the inflation chamber 20. Each of the fingers 16 are spaced from each other and extend from the impact surface away from the inflation chamber 20 in the inflated state.

Figure 1:
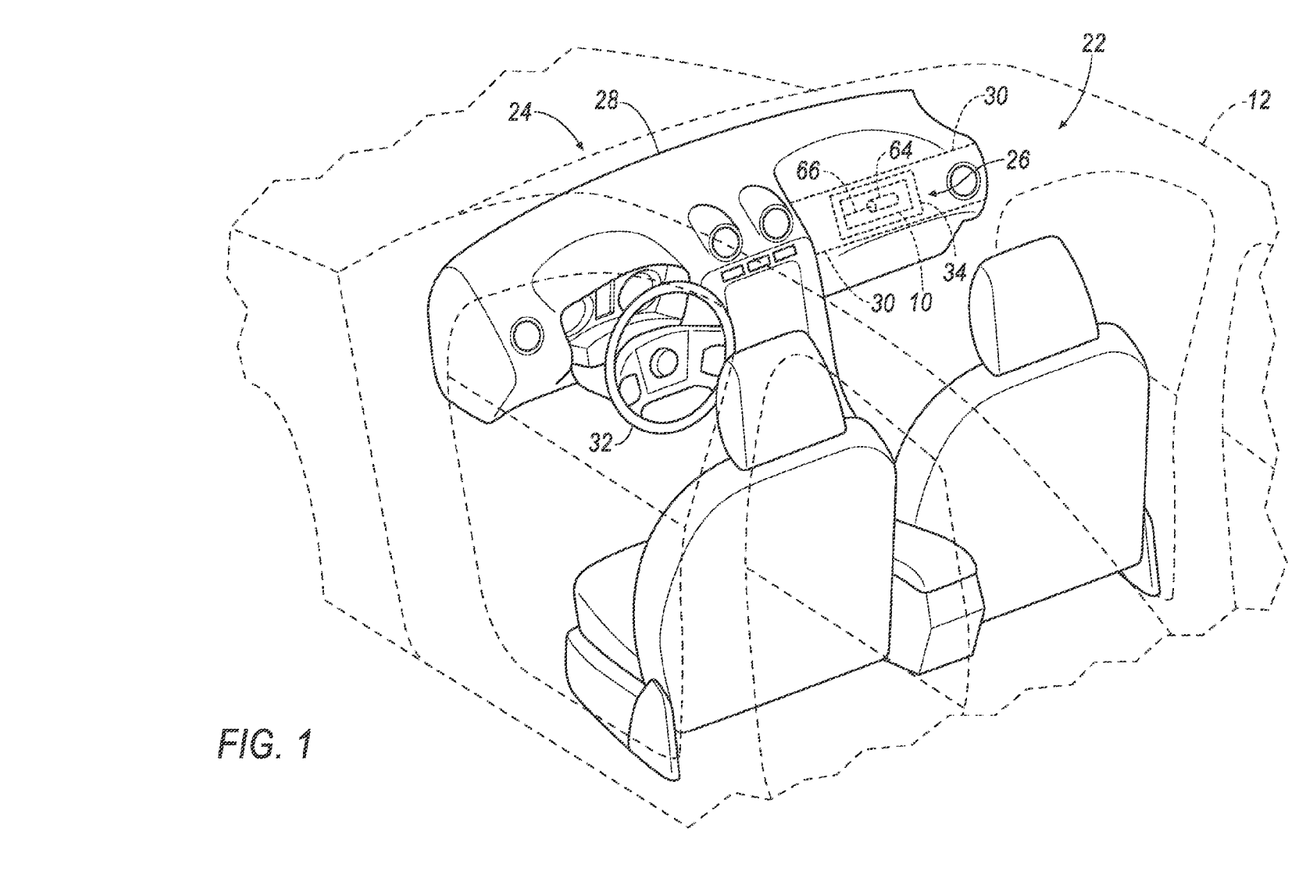
FIG. 1 is a perspective view of a vehicle including an airbag supported by an instrument panel with the airbag in an uninflated state.
Figure 2:
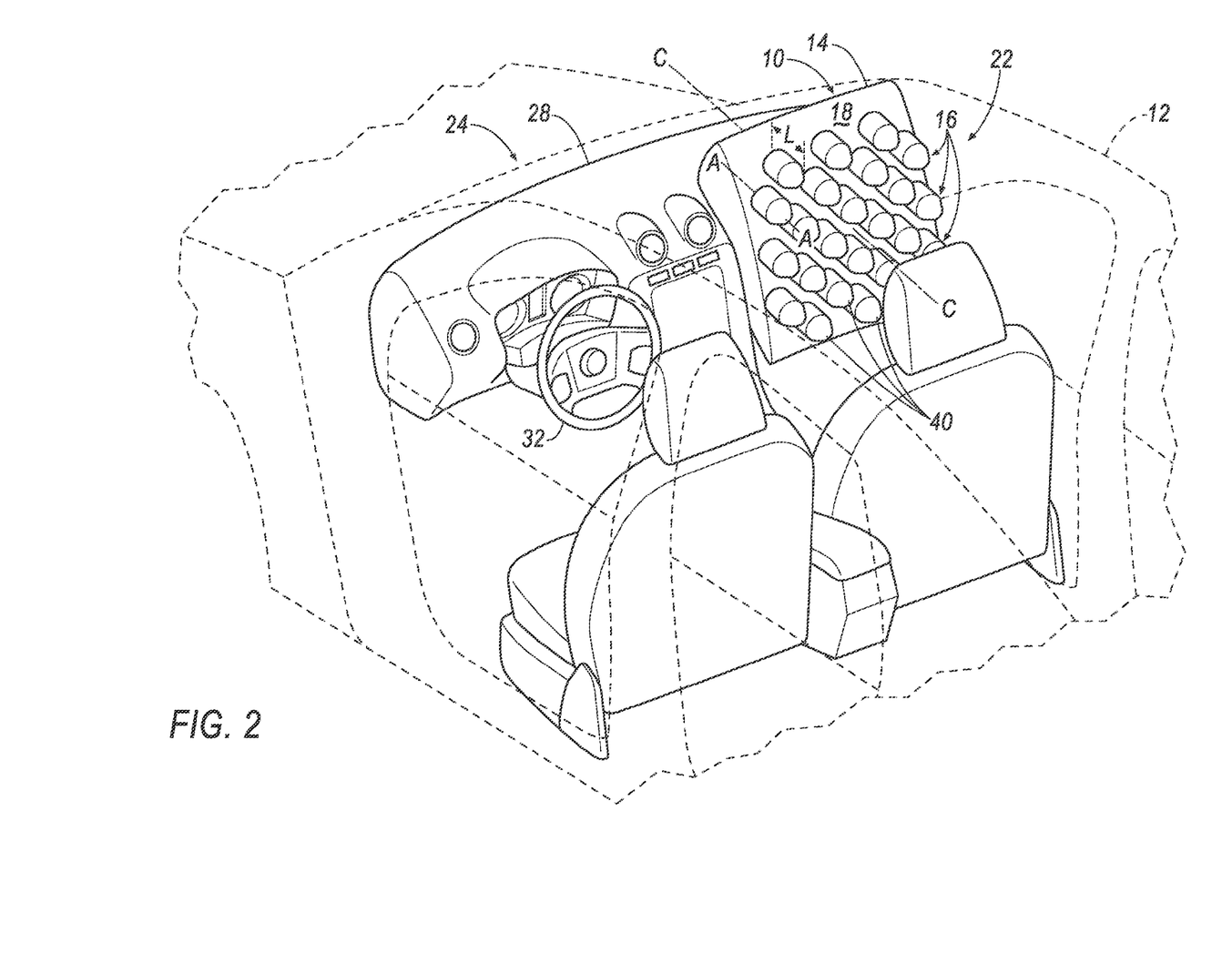
FIG. 2 is the perspective view of FIG. 1 including the airbag in an inflated state and including a plurality of fingers extending from an impact surface.
Figure 3:
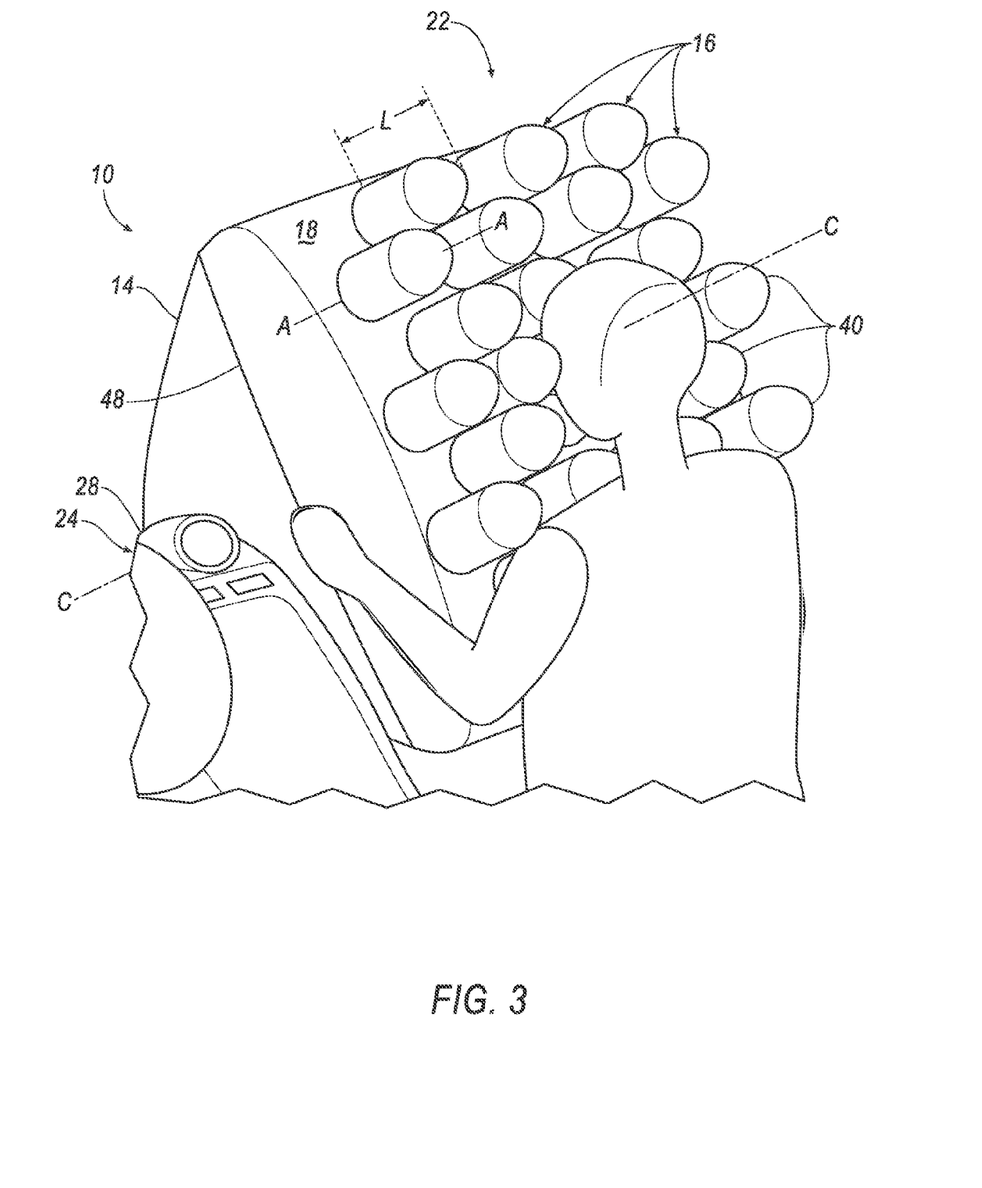
FIG. 3 is a perspective view of the airbag in the inflated state with an occupant impacting the airbag in the inflated state.

During a vehicle impact, the airbag 10 may be inflatable from an uninflated state, as shown in FIG. 1, to the inflated state (which is the same state as the inflated state of the inflation chamber 20 set forth above), as shown in FIGS. 2-7. During the vehicle impact, an occupant may be forced into the fingers 16 and the impact surface 18 of the airbag 10 in the inflated state. Some vehicle impacts, e.g., side impact, frontal offset impacts, far side oblique impact, near side oblique impact, etc., may cause the occupants to move at an angle toward vehicle components, e.g., toward an A-pillar, hinge pillar, door, etc. During these types of impacts, the fingers 16 may slow or stop the head of the occupant from sliding across the airbag 10 to reduce the likelihood of the head of the occupant impacting components of the vehicle 12. In this situation, as the head of the occupant impacts the fingers 16, the fingers 16 locally collapse to absorb the energy from the occupant. In other words, the fingers 16 impacted by the occupant may collapse, and the other fingers 16 may remain extended in the inflated state. When the fingers 16 locally collapse when impacted by the occupant, the fingers 16 may form a pocket (not numbered), as shown in FIG. 3, around the head of the occupant to retain the head of the occupant on the airbag 10. The fingers 16 locally collapse to assist in limiting or preventing sliding of the head across the airbag 10 and/or head rotation after contact with the airbag 10, which may reduce head injury criteria (HIC) and/or brain injury criteria (BrIC).

The vehicle 12 may, for example, be any suitable type of automobile. For example, the vehicle 12 may be a sedan, a light duty automobile, a hybrid automobile, or any other suitable type of automobile. In other words, the vehicle 12 may be in any suitable automobile classification.

As shown in FIGS. 1-3, the vehicle 12 may include a vehicle safety system 22 having a reaction surface 24 and an airbag assembly 26, which includes the airbag 10. The reaction surface 24 may be a rigid surface that supports the airbag assembly 26, and specifically, supports the airbag 10 when the airbag 10 is in the inflated state. The airbag assembly 26 may be mounted to the reaction surface 24, as set forth below. When the airbag 10 is in the inflated state, the reaction surface 24 may provide a counteracting force against the airbag 10 when the airbag 10 is impacted by the head of the occupant such that the airbag 10 is squeezed between the head of the occupant and the reaction surface 24.

Figure 8:
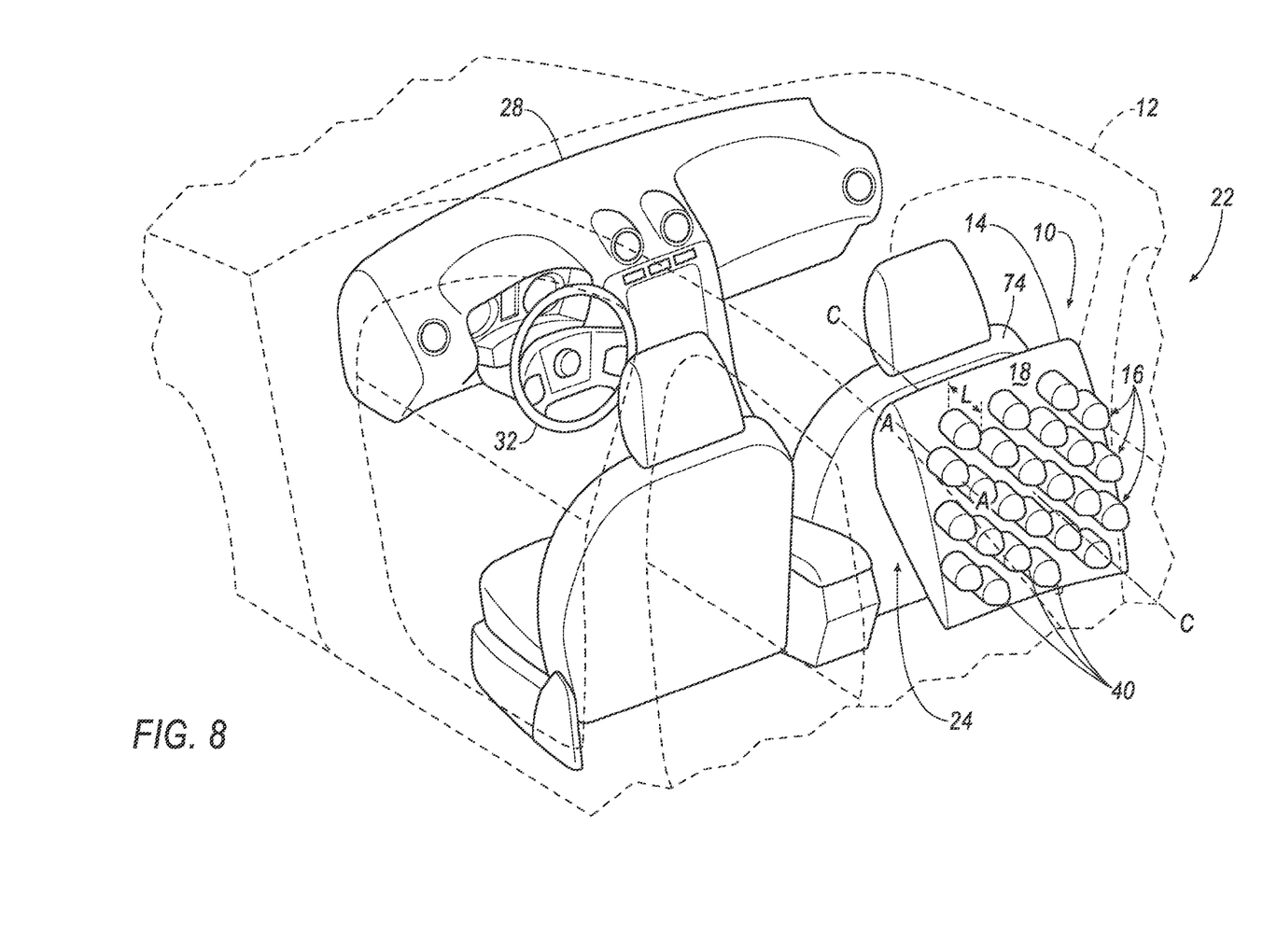
FIG. 8 is a perspective view of another embodiment of the vehicle including the airbag supported by a seatback with the airbag in the inflated state.

As one example, the reaction surface 24 may be an instrument panel 28, as shown in FIGS. 1-3. Specifically, as shown in FIG. 1, the reaction surface 24 may be a frame beam 30 of the instrument panel 28. As another example, the reaction surface 24 may be a steering wheel 32. As another example, the reaction surface 24 may be a seatback 74 of a seat, e.g., a front seat, as shown in FIG. 8. The seatback 74 is on a front passenger seat in FIG. 8, but may alternatively be on any one or all of the seatbacks 74 of the vehicle 12. In these examples, the airbag 10 may be inflatable from the reaction surface 24 in a vehicle-rearward direction. In the alternative to the examples above, the reaction surface 24 may be any suitable surface in the vehicle 12.

With reference to FIG. 1, the airbag assembly 26 may include a base 34 attached to the reaction surface 24, e.g., the frame beam 30 of the instrument panel 28, and supporting the airbag 10. The base 34 may house the airbag 10 in the uninflated state and may support the airbag 10 on the reaction surface 24 in the inflated state. The base 34 may, for example, include clips, panels, etc. for attaching to the airbag 10 and for attaching the airbag assembly 26 to the reaction surface 24.

The airbag 10 may be any suitable type of airbag 10. For example, the airbag 10 may be a front seat passenger airbag, as shown in FIGS. 1-3. As another example, the airbag 10 may be a driver airbag, a curtain airbag, a side airbag, a knee airbag, or any other suitable type of airbag.

The airbag 10, e.g., the panel 14, may be formed of any suitable type of material, e.g., from a woven polymer. For example, the airbag 10 may be formed of woven nylon yarn, e.g., nylon 6. Other suitable exampled include polyether ether ketone (PEEK), polyetherketoneketone (PEKK), polyester, or any other suitable polymer. The woven polymer may include a coating such as silicone, neoprene, urethane, polyorganosiloxane, etc.

The panel 14 may be a single continuous unit, e.g., a single piece of fabric. Alternatively, the panel 14 may include a plurality of segments, i.e., two or more. The segments may be attached to each other in any suitable fashion, e.g., a plurality of panels attached by stitching, ultrasonic welding, etc.

As shown in FIGS. 4-7, the panel 14 may include one or more deflation vents 36. The deflation vents 36 may extend through the panel 14 to the inflation chamber 20 and may be in communication with the atmosphere through the deflation vents 36. The deflation vents 36 may be any suitable shape, e.g., circular, rectangular, etc., and may be located at any suitable location on the panel 14.

With reference to FIGS. 2 and 3, as set forth above, the impact surface 18 is spaced from the reaction surface 24 in the inflated state. For example, the impact surface 18 is adjacent to the occupant in the inflated state. The impact surface 18 may face the occupant in the inflated state. The impact surface 18 may be any suitable surface of the panel 14 that is impacted by the occupant during a vehicle impact.

As shown in FIGS. 2-6, the plurality of fingers 16 may extend from the impact surface 18 away from the inflation chamber 20 in the inflated state. The plurality of fingers 16 may each extend along an axis A transverse to the impact surface 18. In other words, the plurality of fingers 16 may extend towards the occupant in the inflated state, as shown in FIG. 3. The fingers 16 may be located at any suitable location on the impact surface 18.

Figure 7:
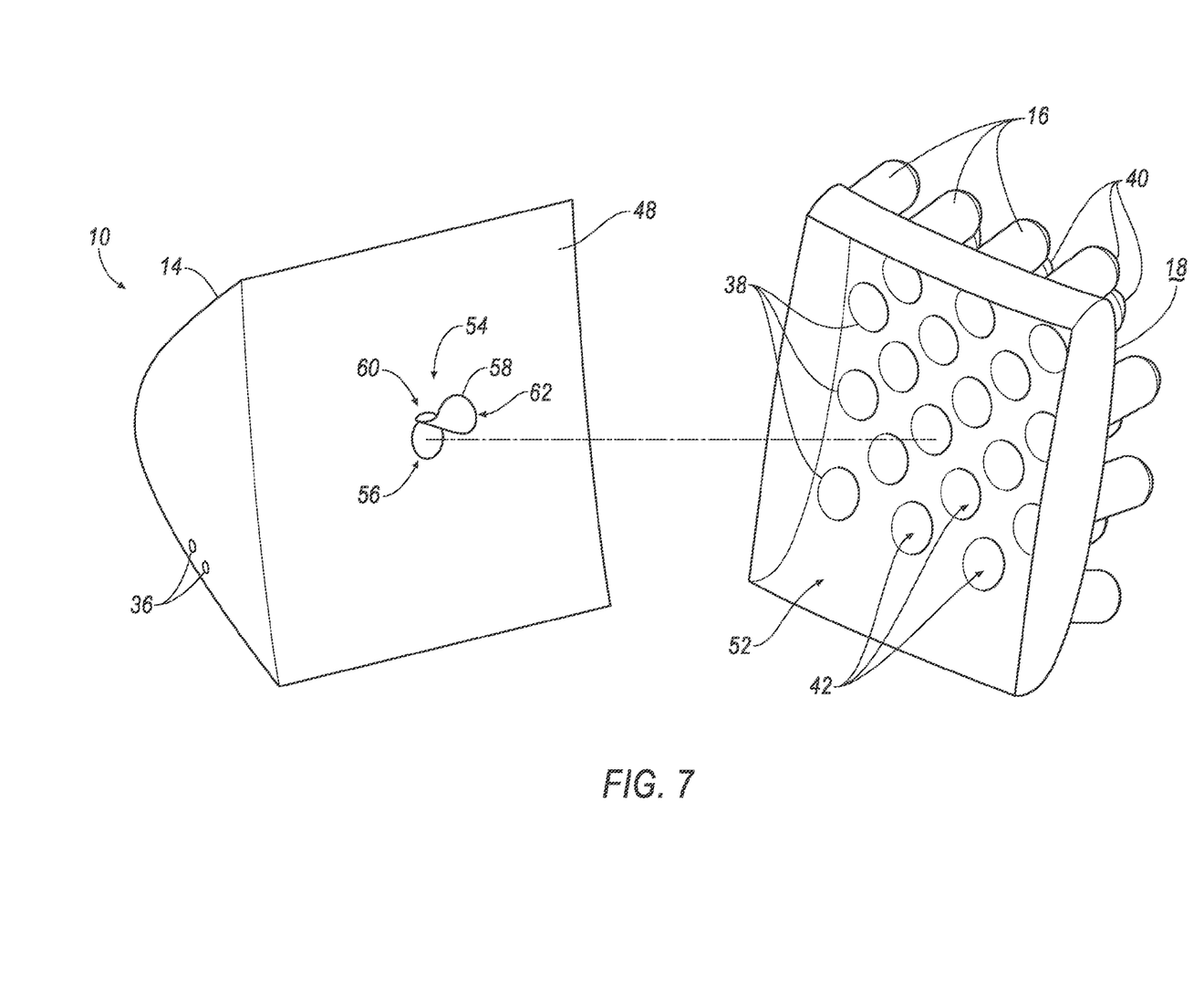
FIG. 7 is an exploded view of the airbag showing the panel exploded to illustrate the partition.

As shown in FIG. 7, the impact surface 18 may include a plurality of openings 38 spaced from each other. The openings 38 may extend through the impact surface 18 to the inflation chamber 20. The openings 38 may have any suitable shape, e.g., circular, and any suitable size, i.e., diameter, perimeter, etc.

Each of the plurality of fingers 16 may encompass one of the openings 38 on the impact surface 18. In other words, each finger 16 may cover one of the openings 38 such that each of the openings 38 are covered by one finger. Each of the fingers 16 may be attached to the impact surface 18 around one of the openings 38. Each finger 16 may be attached to the impact surface 18 in any suitable manner. For example, each finger 16 may be sewn to the impact surface 18. Alternatively, the fingers 16 may be attached to the impact surface 18 by adhesive, one-piece woven loom technology, or any other suitable attachment.

Figure 4:
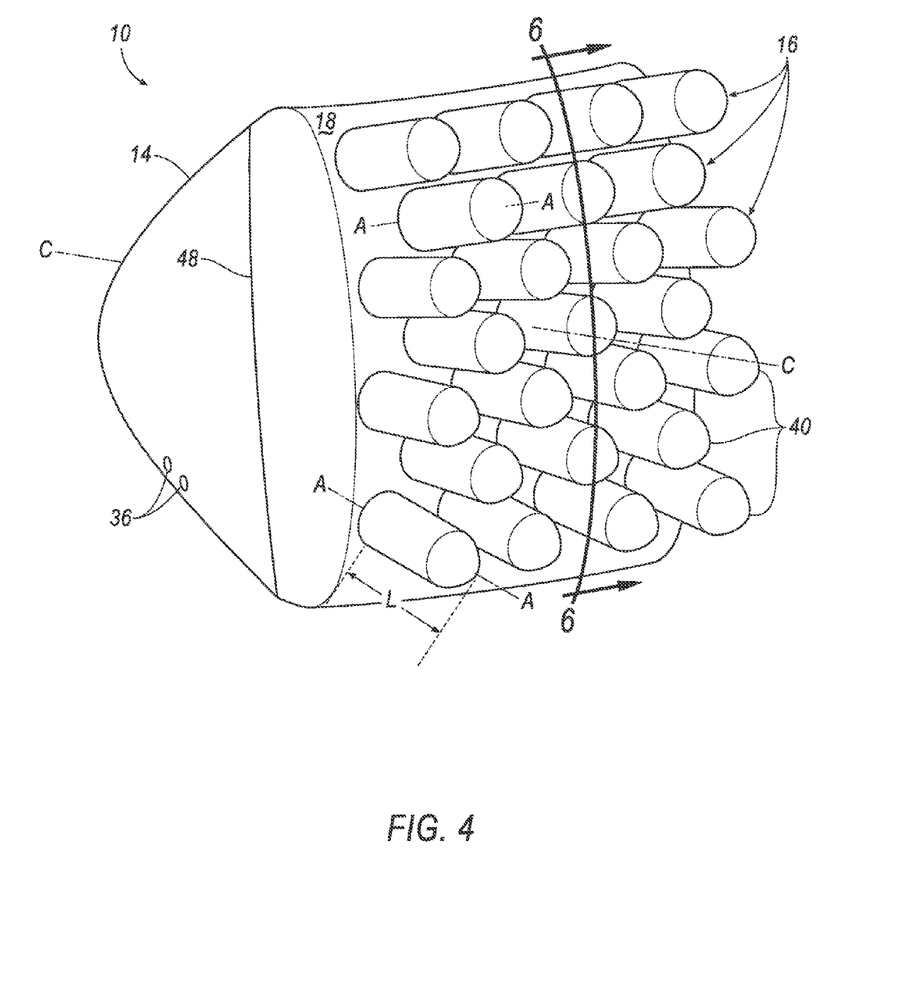
FIG. 4 is a perspective view of one embodiment of the airbag in the inflated state in which the each of the plurality of fingers have the same length determined from the impact surface.

When the fingers 16 are attached to the impact surface 18, the plurality of fingers 16 may be spaced from each other, as shown in FIGS. 2-4. The plurality of fingers 16 may be spaced from each other by any suitable distance. For example, the spacing may be the same between each finger 16 or may vary. The fingers 16 may be arranged on the impact surface 18 in any suitable pattern.

The plurality of fingers 16 may include a distal end 40 spaced from the impact surface 18 in the inflated state, as shown in FIGS. 2-5. Each finger 16 may have a length L determined from the impact surface 18 to the distal end 40 in the inflated state. In other words, the length L of each finger 16 may be determined from the extension of the finger 16 away from the impact surface 18. The plurality of fingers 16 may have any suitable length L.

The plurality of fingers 16 are in communication with the inflation chamber 20 through the openings 38 of the impact surface 18. Specifically, each finger 16 may enclose a chamber 42 in communication with the inflation chamber 20 through the openings 38 of the impact surface 18. For example, the chamber 42 in the inflated state may be inflated by gas flow from the inflation chamber 20 through the openings 38 of the impact surface 18 to the chamber 42. In other words, each finger 16 may be inflatable from the uninflated state to the inflated state. Each chamber may extend from the impact surface 18 to the distal end 40 of each finger.

As shown in FIG. 4, in the inflated state, the panel 14, e.g., the impact surface 18, may have an axis C about which the fingers 16 are spaced. The axis C may, for example, extend through the panel 14, e.g., the impact surface 18, at a center of the panel 14, or at any suitable point on the panel 14. When the airbag 10 is in the inflated state, the axis C may extend transverse to the reaction surface 24, e.g., perpendicular.

Figure 5:
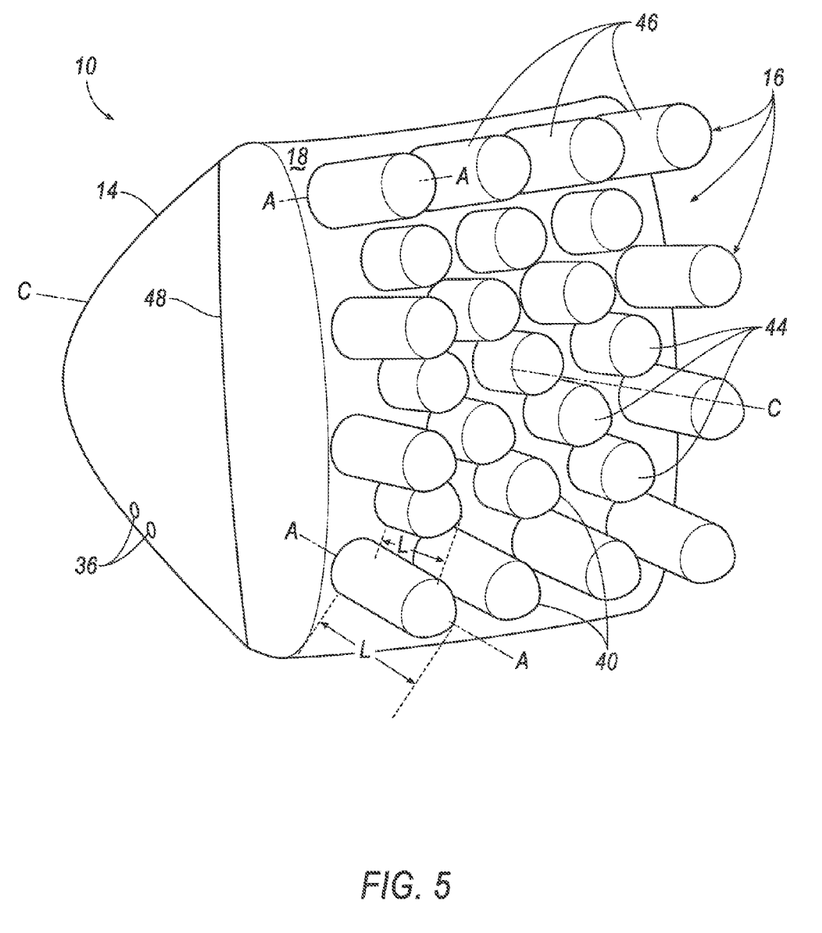
FIG. 5 is a perspective view of the airbag in the inflated state including a plurality of inner fingers and a plurality of outer fingers that are longer than the inner fingers.

With reference to FIGS. 3 and 4, the fingers 16 may each have the same length L, e.g., the length L from the impact surface 18 to the distal end 40. Alternatively, the length L of the fingers 16 from the impact surface 18 to the distal end 40 may vary. As one example, as shown in FIG. 5, the plurality of fingers 16 may include inner fingers 44 and outer fingers 46 spaced further from the axis C than the inner fingers 44. The inner fingers 44 and the outer fingers 46 may have different lengths L. For example, the outer fingers 46 may have a greater length L, i.e., are longer, than the inner fingers 44 measured from the impact surface 18 to the distal end 40, as shown in FIG. 5. In other words, the distal end 40 of the outer fingers 46 may extend further away from the impact surface 18 than the distal end 40 of the inner fingers 44.

As another example, the lengths L of the fingers 16 may progressively increase outwardly from the axis C. For example, each finger 16 may be longer than each adjacent finger 16 spaced closer to the axis C and shorter than each adjacent finger 16 spaced further from the axis C. As one example, the length L of each finger 16 may be proportional to the spacing of each finger 16 from the axis C, e.g., the length L of each finger 16 increases the further each finger 16 is from the axis C.

The fingers 16 may each have any suitable shape. For example, the fingers 16 may be generally cylindrical in the inflated state, as shown in FIGS. 2-5. As another example, the fingers 16 may taper in a direction from the impact surface 18 to the distal and, or may taper in a direction from the distal end 40 to the impact surface 18. Alternatively, the fingers 16 may be a frustum, a rectangle, a trapezoid, or any other suitable shape. The fingers 16 may each have the same shape, or some or all of the fingers 16 may have different shapes. The fingers 16 may have any suitable size. Each of the fingers 16 may have the same size, or some or all of the fingers may be sized differently than each other.

Figure 6A:
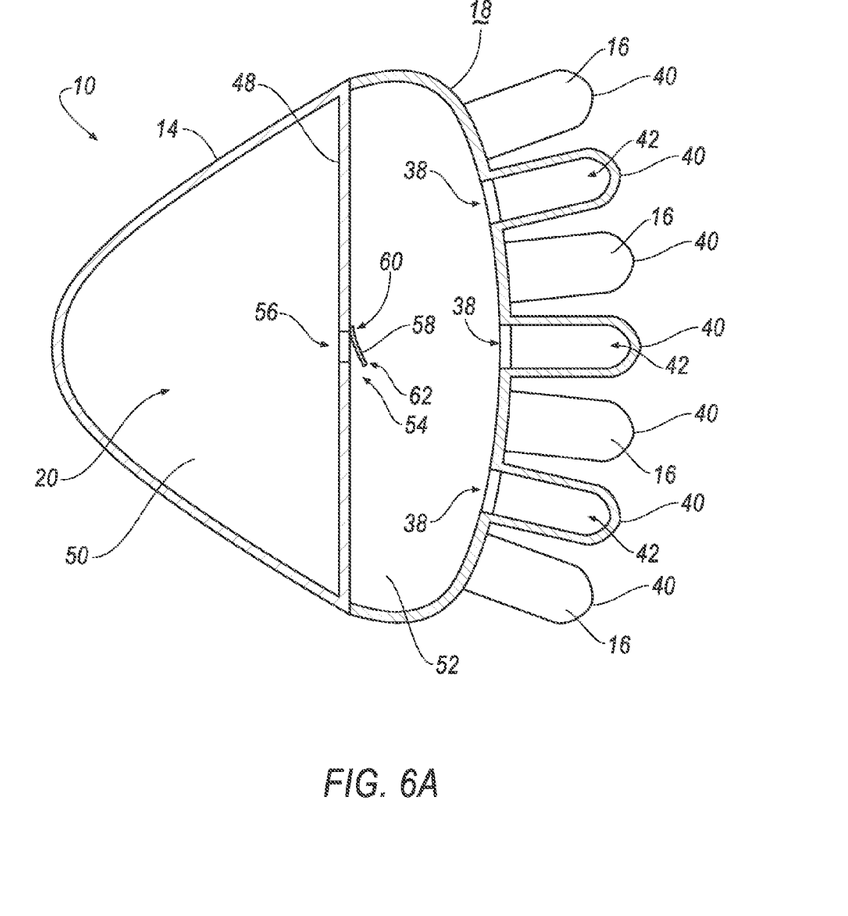
FIG. 6A is a cross-sectional view of the airbag along line 6 in FIG. 4 including a panel defining an inflation chamber and a partition connected to the panel dividing the inflation chamber into an inner chamber and an outer chamber, with a one-way vent on the partition allowing gas flow from the inner chamber to the outer chamber during inflation of the airbag.

As shown in FIGS. 6A and 7, the airbag 10 may include a partition 48 extending across the inflation chamber 20 to the panel 14. The partition 48 may be connected to the panel 14 in the inflation chamber 20 dividing the inflation chamber 20 into an inner chamber 50 and an outer chamber 52. The partition 48 may be connected to the panel 14 in any suitable manner. For example, the partition 48 may be stitched to the panel 14. As other examples, the partition 48 may be connected to the panel 14 by adhesive, ultrasonic welding, or any other suitable connection. The partition 48 may be formed from the same type of material as the panel 14, or a different type of material.

Figure 6B:
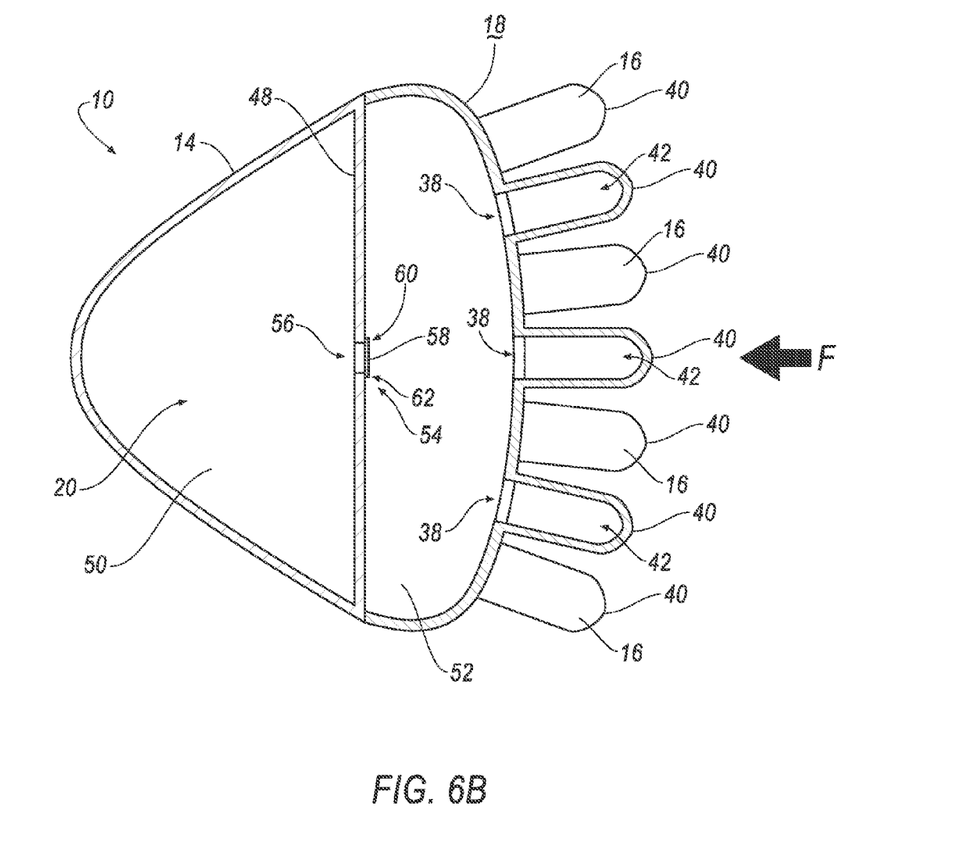
FIG. 6B is a cross-sectional view of the airbag in the inflated state with the one-way vent closed to prevent gas flow from the outer chamber to the inner chamber when a force is applied to the outer chamber.

As shown in FIGS. 6A-B, the inner chamber 50 may be between the reaction surface 24 and the partition 48 in the inflation chamber 20. The inner chamber 50 may be in fluid communication with the deflation vents 36. In other words, the inner chamber 50 may be in communication with the atmosphere through the deflation vents 36.

With continued reference to FIGS. 6A-B, the outer chamber 52 may be between the partition 48 and the impact surface 18 in the inflation chamber 20. In other words, the outer chamber 52 may be adjacent to the plurality of fingers 16 in the inflated state. The outer chamber 52 may be in communication with the plurality of fingers 16. For example, the openings 38 of the impact surface 18 may allow gas flow from the outer chamber 52 to the fingers 16, i.e., the chambers.

As shown in FIGS. 6A-7, a vent 54 may be disposed on the partition 48 between the inner chamber 50 and the outer chamber 52. The vent 54 may be a one-way vent allowing gas flow from the inner chamber 50 to the outer chamber 52 and preventing gas flow from the outer chamber 52 to the inner chamber 50. Alternatively, the vent 54 may allow for two-way gas flow. The vent 54 may be disposed in any suitable position on the partition 48.

With continued reference to FIGS. 6A-7, the one-way vent may include a hole 56 in the partition 48 and a diaphragm 58 attached to the partition 48 in the outer chamber 52 adjacent to the hole 56. The diaphragm 58 may include an attached portion 60 and an unattached portion 62. The attached portion 60 may be attached to the partition 48 partially around the hole 56. The unattached portion 62 may be lifted from the partition 48 and/or rotated about the attached portion 60. In other words, part of the diaphragm 58 may be attached to the partition 48 and part of the diaphragm 58 may be unattached to the partition 48. The diaphragm 58 may be attached to the partition 48 in any suitable manner, e.g., stitching, adhesive, etc. The diaphragm 58 may have a greater, i.e., larger, size than the hole 56.

The diaphragm 58 may selectively cover the hole 56. In other words, the diaphragm 58 may be moved from a closed position, as shown in FIG. 6A, to an open position, as shown in FIG. 6B. For example, during inflation, pressure caused by the inflation medium creates a positive pressure differential between the inner chamber 50 and the outer chamber 52, which forces the diaphragm 58 to the open position to allow gas flow from the inner chamber 50 to the outer chamber 52. A positive pressure differential between the outer chamber 52 and the inner chamber 50, e.g., caused by impact of the occupant against the fingers 16 and/or the impact surface 18, forces the diaphragm 58 to the closed position. The diaphragm 58 limits or prevents airflow from the outer chamber 52 to the inner chamber 50 in the closed position. In this situation, the pressure in the outer chamber 52 may increase and/or the pressure in the inner chamber 50 may decrease, causing the diaphragm 58, i.e., the unattached portion 62, to fall against the partition 48 and cover the hole 56.

The hole 56 and the diaphragm 58 may be a same or different shape. The hole 56 and the diaphragm 58 may be any suitable shape. For example, the hole 56 and the diaphragm 58 may be circular. Alternatively, the hole 56 and the diaphragm 58 may be rectangular, triangular, or any other suitable shape. The diaphragm 58 may be formed of the same type of material as the airbag 10 or a different type of material than the airbag 10.

The airbag assembly 26 may include an inflator 64 in fluid communication with the airbag 10 that inflates the airbag 10 from the uninflated state to the inflated state. The inflator 64 expands the airbag 10 with an inflation medium, such as a gas, to move the airbag 10 from the uninflated state to the inflated state. Specifically, the inflator 64 may be in communication with the inner chamber 50 to supply the inflation medium to the inflation chamber 20. The inflator 64 may be supported in the base 34 of the airbag assembly 26, as shown in FIG. 1, or may be disposed in any other suitable location.

The inflator 64 may be, for example, a pyrotechnic inflator that uses a chemical reaction to drive the inflation medium into the airbag 10. Alternatively, the inflator 64 may be, for example, a cold-gas inflator that, when activated, ignites a pyrotechnic charge that creates an opening for releasing the pressurized inflation medium to the airbag 10 via a fill tube 66. Alternatively, the inflator 64 may be of any suitable type, for example, a hybrid inflator.

Figure 9:
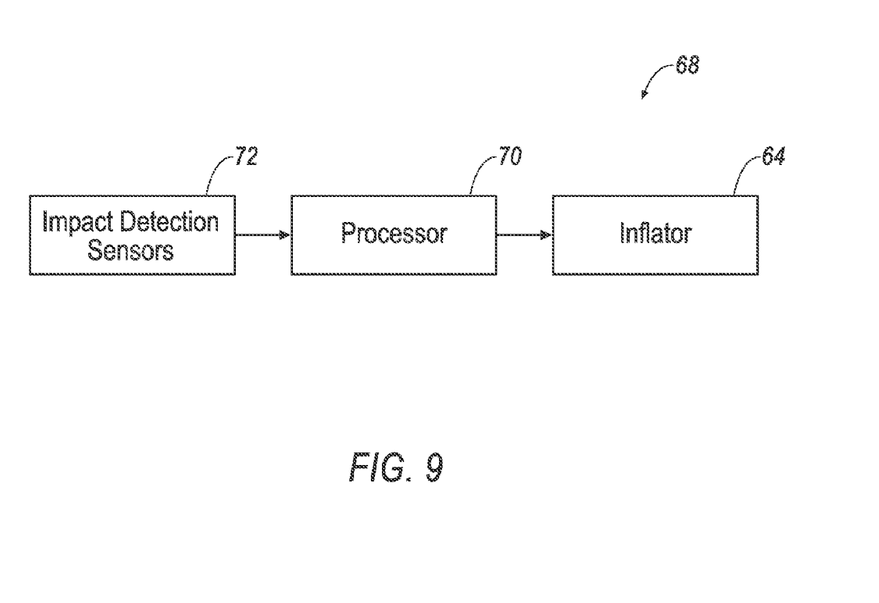
FIG. 9 is a flowchart of an inflation system of the vehicle.

With reference to FIG. 9, the vehicle 12 may include an inflation system 68. The inflation system 68 includes a processor 70 programmed to initiate an inflation of the airbag 10 in response to the vehicle impact. The processor 70 may be embedded in a microcontroller. The microcontroller may include memory, etc. The memory of the microcontroller may store instructions executable by the processor 70 and the processor 70 may read the instructions from the memory and execute the instructions.

The vehicle 12 may include impact detection sensors 72 programmed to detect the vehicle impact to the vehicle 12. The impact detection sensors 72 may be disposed in the instrument panel 28 or elsewhere in the vehicle 12. The impact detection sensors 72 may be of various types, e.g., pressure sensor, acceleration sensor, vision sensor, etc. When the vehicle impact occurs, the processor 70 may receive one or more signals from the impact detection sensors 72 indicating the vehicle impact. In response to receiving the signals from the impact detection sensors 72, the processor 70 may initiate the inflation of the airbag 10. Alternatively, the processor 70 may initiate the inflation of the airbag 10 selectively based on information from the impact detection sensors 72 identifying the physical characteristics of the vehicle impact, e.g., which side of the vehicle impacted, amount of pressure applied to the vehicle 12, etc. and also seat occupancy information, e.g., by using the occupancy sensors disposed inside the seats sensing the occupancy status of the seats.

In order to receive the signals from the impact detection sensors 72 and to initiate the inflation of the airbag 10, the processor 70 communicates with the impact detection sensors 72 and the inflator 64, e.g., through a direct electrical wiring, through which an analog or a digital signal is transmitted, or through a communication network like CAN (Control Area Network), Ethernet, LIN (Local Interconnect Network) or any other way.

In operation, the airbag 10 is in the uninflated state, as shown in FIG. 1, under normal operating conditions of the vehicle 12. When the impact detection sensor 72 senses an impact of the vehicle 12, the processor 70 triggers the inflator 64 to inflate the airbag 10 with the inflation medium from the uninflated state to the inflated state. When the inflator 64 inflates the airbag 10 to the inflated state, the inflation medium flows to the inner chamber 50 of the inflation chamber 20 increasing the pressure in the inner chamber 50. As the pressure is increased in the inner chamber 50, the diaphragm 58 is lifted away from the partition 48 to the uncovered position allowing the inflation medium to flow into the outer chamber 52. When the inflation medium is in the outer chamber 52, the inflation medium flows through the openings 38 in the impact surface 18 into the chambers of the plurality of fingers 16. The plurality of fingers 16 extend along the axis A transverse to the impact surface 18 away from the inflation chamber 20 as the inflation medium fills the chambers. As the occupant moves within the vehicle 12 due to the momentum of the vehicle impact, the occupant may move towards the fingers 16. When the occupant impacts the fingers 16, the fingers 16 may locally collapse to absorb energy from the occupant, as shown in FIG. 3. Specifically, the fingers 16 may absorb energy from the head and upper torso of the occupant to reduce the rotation of the head of the occupant. In the configuration shown in the Figures in which the vent 54 is a one-way vent, this may increase the pressure of the outer chamber 52 relative to the inner chamber 50, forcing the one-way vent to the closed position, e.g., the diaphragm 58 against the partition 48 to the covered position, to prevent the gas flow from the outer chamber 52 to the inner chamber 50. In this situation, the outer chamber 52 pressure is maintained and the fingers 16 may retain the head of the occupant on the airbag 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
 a panel including an impact surface and defining an inflation chamber inflatable to an inflated state;
 a plurality of fingers in communication with the inflation chamber, the fingers being spaced from each other in a repeating pattern on the impact surface and extending from the impact surface away from the inflation chamber in the inflated state; and
 a partition connected to the panel in the inflation chamber dividing the inflation chamber into an inner chamber and an outer chamber, the outer chamber being in communication with the fingers, and a vent on the partition between the inner chamber and the outer chamber.

2. The airbag according to claim 1, wherein each finger is generally cylindrical and extends along an axis transverse to the impact surface.

3. The airbag according to claim 1, wherein each finger encloses a chamber in communication with the inflation chamber.

4. The airbag according to claim 1, wherein the panel has an axis in the inflated state about which the plurality of fingers are spaced, and wherein the plurality of fingers include inner fingers and outer fingers spaced further from the axis than the inner fingers, the outer fingers being longer than the inner fingers.

5. The airbag according to claim 1, wherein each finger has a length from the impact surface to a distal end, wherein the panel has an axis in the inflated state about which the plurality of fingers are spaced, and wherein the lengths of the fingers progressively increase outwardly from the axis.

6. The airbag according to claim 1, wherein the vent includes a hole in the partition and a diaphragm attached to the partition in the outer chamber adjacent to the hole and selectively covering the hole.

7. The airbag according to claim 1, wherein the vent is a one-way vent allowing gas flow from the inner chamber to the outer chamber and preventing gas flow from the outer chamber to the inner chamber.

8. A vehicle safety system comprising:
 a reaction surface;
 an airbag supported by the reaction surface, the airbag being inflatable away from the reaction surface to an inflated state, the airbag including a panel having an impact surface spaced from the reaction surface in the inflated state;
 the panel defining an inflation chamber inflatable to the inflated state;
 a plurality of fingers each elongated along an axis transverse to the impact surface, the fingers being spaced from each other in a repeating pattern on the impact surface and extending from the impact surface in a direction away from the reaction surface in the inflated state; and
 a partition connected to the panel in the inflation chamber dividing the inflation chamber into an inner chamber and an outer chamber, the outer chamber being in communication with the fingers, and a vent on the partition between the inner chamber and the outer chamber.

9. The vehicle safety system according to claim 8, wherein each finger is generally cylindrical.

10. The vehicle safety system according to claim 8, wherein each finger encloses a chamber in communication with the inflation chamber.

11. The vehicle safety system according to claim 8, wherein the impact surface has an axis in the inflated state about which the fingers are spaced, and wherein the plurality of fingers include inner fingers and outer fingers spaced further from the axis than the inner fingers, the outer fingers being longer than the inner fingers.

12. The vehicle safety system according to claim 8, wherein each finger has a length from the impact surface to a distal end, wherein the impact surface has an axis in the inflated state about which the fingers are spaced, and wherein the lengths of the fingers progressively increase outwardly from the axis.

13. The vehicle safety system according to claim 8, wherein the vent includes a hole in the partition and a diaphragm attached to the partition in the outer chamber adjacent to the hole and selectively covering the hole.

14. The vehicle safety system according to claim 8, wherein the vent is a one-way vent allowing gas flow from the inner chamber to the outer chamber and preventing gas flow from the outer chamber to the inner chamber.

15. The vehicle safety system according to claim 8, further comprising an inflator in communication with the inner chamber.

16. The vehicle safety system according to claim 8, wherein the reaction surface is an instrument panel.

* * * * *